(12) United States Patent
Baker et al.

(10) Patent No.: US 7,566,569 B1
(45) Date of Patent: Jul. 28, 2009

(54) METHOD FOR MEASURING SURFACE TEMPERATURE

(75) Inventors: Gary A. Baker, Los Alamos, NM (US);
Sheila N. Baker, Los Alamos, NM (US);
T. Mark McCleskey, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 32 days.

(21) Appl. No.: 11/843,732

(22) Filed: Aug. 23, 2007

Related U.S. Application Data

(62) Division of application No. 10/934,454, filed on Sep. 7, 2004, now Pat. No. 7,497,993.

(51) Int. Cl.
*G01N 33/00* (2006.01)
(52) U.S. Cl. .................... 436/6; 422/82.12; 422/82.08; 422/99; 436/147
(58) Field of Classification Search ................ 422/68.1, 422/82.05, 82.07, 82.08, 82.09, 82.11; 436/6, 436/147
See application file for complete search history.

*Primary Examiner*—Sam P Siefke
(74) *Attorney, Agent, or Firm*—Thomas S. O'Dwyer; James Durkis; Paul A. Gottlieb

(57) ABSTRACT

The present invention relates to a method for measuring a surface temperature using is a fluorescent temperature sensor or optical thermometer. The sensor includes a solution of 1,3-bis(1-pyrenyl)propane within a 1-butyl-1-1-methyl pyrrolidinium bis(trifluoromethylsulfonyl)imide ionic liquid solvent. The 1,3-bis(1-pyrenyl)propane remains unassociated when in the ground state while in solution. When subjected to UV light, an excited state is produced that exists in equilibrium with an excimer. The position of the equilibrium between the two excited states is temperature dependent.

10 Claims, 2 Drawing Sheets

METHOD FOR MEASURING SURFACE TEMPERATURE

RELATED CASES

This application is a divisional of application Ser. No. 10/934,454 filed Sep. 7, 2004, now U.S. Pat. No. 7,497,993 the entire contents of which are hereby incorporated by reference. The present invention's method for measuring a surface temperature has been assigned to class 436, subclass 147.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to thermometry and more particularly to a fluorescent temperature sensor comprising an ionic liquid solvent and dissolved fluorescent material capable of forming an excimer.

BACKGROUND OF THE INVENTION

Real time temperature monitoring is conducted in an industrial setting for process optimization, waste minimization, and energy conservation. For example, precise and real time in-vivo temperature monitoring may be used in applications such as biomedical and cancer diagnosis and during hypothermia therapy or surgery where temperature fluctuations of even a few degrees can create problems or even be life-threatening to a patient. Despite the commercial importance of this technology, the development of molecular temperature sensors has been inadequate. Although conventional contact techniques such as liquid-in-glass thermometers, thermistors, thermocouple taps, and resistance temperature detectors (RTDs) have their place, employing light as the information carrier rather than heat has several benefits. Optical temperature sensors, which are often referred to as "optodes" or "optrodes", may be deployed in situations where it is undesirable or impossible for a wire connection, to measure temperature at a location having excessive electromagnetic noise, to monitor temperature in a corrosive environment or an explosion and importantly, to monitoring the temperature of high-speed moving parts (turbine blades, for example).

Non-contact optical approaches are also important because they provide temperature measurements with high spatial resolution, and are useful in mapping temperature for applications that require high spatial resolution, at the cellular level for example, in microfluidic chips and microelectromechanical systems (MEMS), and for locating heat "bottlenecks" in integrated circuits, and as temperature monitors for multi-well plates used in biology and combinatorial chemistry.

Remote two-dimensional infrared thermography has been used for measuring temperature. While this technique offers some of the advantages of non-contact approaches, it is limited by the strong absorption of radiation by water vapor and glass. Importantly, few objects truly behave like blackbodies, and therefore radiation from a solid object seldom exhibits a distinctive thermal signature. By contrast, luminescent signals, which are also multidimensional, offer sensitive, selective, and rapid feedback. Luminescence is often the observable of choice of chemosensors and molecular-level devices In the prior art, luminescent temperature sensors measure temperature using the temperature-dependent decay times of excited states of materials, intensities, excitation and/or emission wavelength maxima. There remains a need for better luminescent thermometers.

OBJECTS AND SUMMARY OF THE INVENTION

In view of the above, it is an object of the present invention to provide a robust, precise and broad-ranged ratiometric luminescent thermometer that uses the temperature-dependent excited-state equilibrium of a novel dual fluorescent reporter and ionic liquid. The present thermometer employs the unique thermofluid properties of an ionic liquid; namely, its high thermal coefficient of viscosity and broad liquidus range. Because the associated wavelengths are well resolved, dispersive optics are no longer necessary. As a result, the present invention is well adapted for inexpensive and mobile formats. In addition, by implementing confocal or multi-photon methods, highly localized excitation is made possible thereby adapting the device for uses that include, but are not limited to, on-chip PCR and laser-based T-jump calibration. Further, the present invention may be adapted for utility as a temperature sensitive paint (TSP) by entrapping the ionic liquid within thin transparent sol-gel films. In industrial settings, this embodiment of the present invention would adapt itself to a wide array of designs including coatings on, for example, wings or turbines, to provide a complete temperature-based spatial map that may be used to identify areas of metal fatigue.

In summary, the present invention is a fluorescent temperature sensor or optical thermometer comprising a solution of 1,3-bis(1-pyrenyl)propane within a 1-butyl-1-1-methyl pyrrolidinium bis(trifluoromethylsulfonyl)imide ionic liquid solvent. The 1,3-bis(1-pyrenyl)propane remains unassociated in the ground state while in solution. When subjected to UV light, an excited state is produced that exists in equilibrium with an excimer, the position of the equilibrium between the two excited states being temperature dependent.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

The present invention is a fluorescent temperature sensor or optical thermometer adapted to function in a variety of formats. The molecular temperature sensor comprises a solution of 1,3-bis(1-pyrenyl)propane within an ionic liquid solvent; namely, 1-butyl-1-1-methyl pyrrolidinium bis(trifluoromethylsulfonyl)imide. The 1,3-bis(1-pyrenyl)propane remains unassociated in solution during its ground state. However, when subjected to UV light, an excited state is generated that co-exists in equilibrium with an excimer formed within the solution. The position of equilibrium between the two excited states is temperature dependent and therefore functions to accurately convey the temperature of any object on which the solution is coated or otherwise in contact with. The unique thermofluid properties of the ionic liquid, namely its high thermal coefficient of viscosity and broad liquids range allow the thermometer to be adapted to a wide variety of application.

Figure 1:
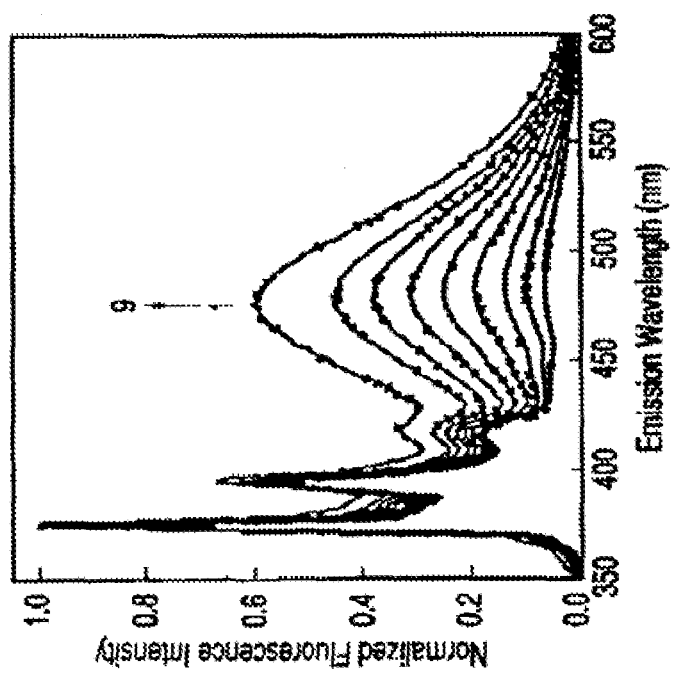
FIG. 1 illustrates emission spectra for an optical thermometer according to the present invention.

FIG. 1 illustrates emission spectra of the present invention normalized to the intensity of the monomer band at $I_{376}$=1.00 for a 5 µM solution of 1,3-bis(1-pyrenyl)propane within 1-butyl-1-1-methyl pyrrolidinium bis(trifluoromethylsulfonyl) imide ionic solution throughout a typical temperature cycle of the present invention. As shown in the graph, the spectral response of the 1,3-bis(1-pyrenyl)propane/ionic liquid system is strongly governed by temperature. Under controlled heating, the excited-state equilibrium is shifted in favor of excimer formation and a prominent band near 475 nm is shown to result. The excitation wavelength of the solution is 325 nanometers (nm). The solid lines indicate spectra recorded during the cooling portion of the cycle. Spectra 1 through 9 correspond to the following temperatures in degrees Celsius (° C.): 30, 40, 50, 60, 70, 80, 90, 100, 120.

Figure 3:
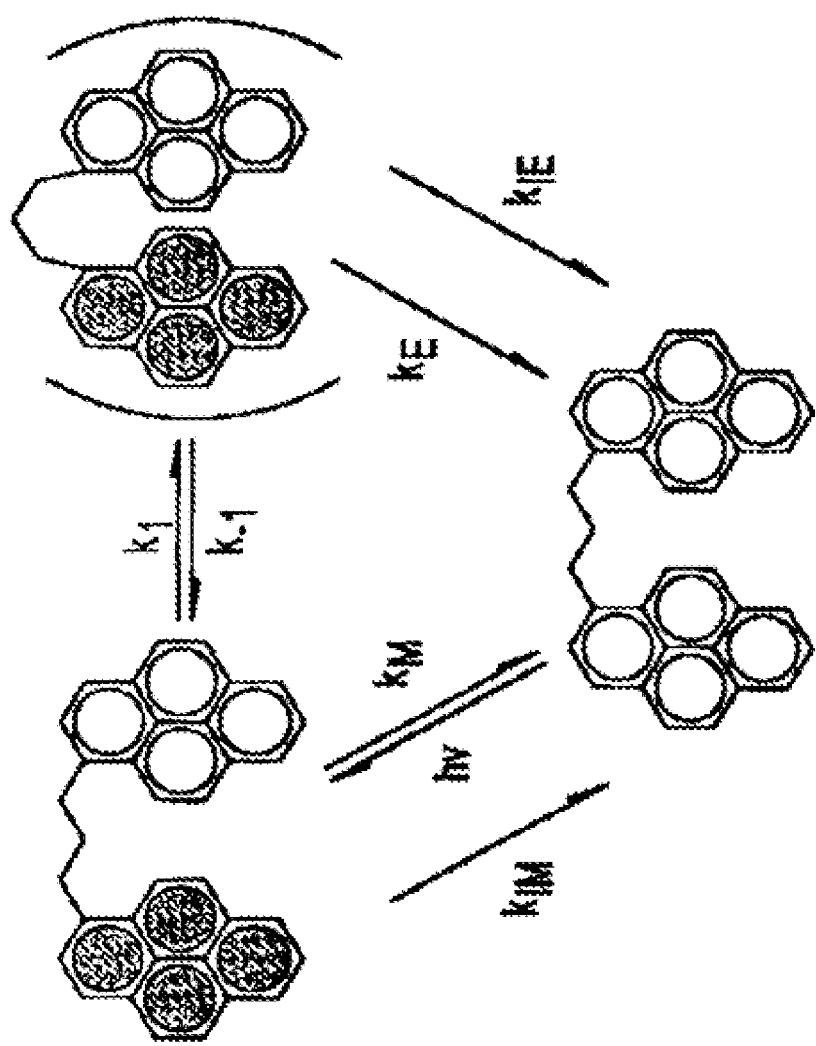
FIG. 3 is a chemical equilibria expression showing the formation of an excimer of the present invention.

Turning to FIG. 3, formation of the excimer of the present invention is summarized by a chemical equilibria expression. The bottom portion of the expression shows 1,3-bis(1-pyrenyl)propane in the ground state. With the appropriate light excitation, the ground state is transformed into an excited state, shown in the top portion of the expression where the dark circles indicate one of the pyrenyl groups in an excited state. This excited state rearranges in space to create the excimer, which is shown in braces in the top right portion of the equilibrium expression. Equilibrium constants k1, k−1, kIM, kM, kE, and Kie correspond to the elementary steps that connect the ground states. The excited state is shown on the top left, and the excimer is shown on the top right. Upon controlled heating, the excited state equilibrium shifts in favor of formation of the excimer and a prominent band near 475 nm results as shown in FIG. 1.

The unnormalized emission spectral data of the present invention exhibits an isoemissive point (wavelength where the intensity does not change with temperature) at 446 nm for temperatures greater than or equal to 90 degrees Celsius which corresponds to the chemical equilibrium expression model depicted in the FIG. 3. Although a single isoemissive point is not essential to operation of the sensor, in the present example it does exist.

Figure 2:
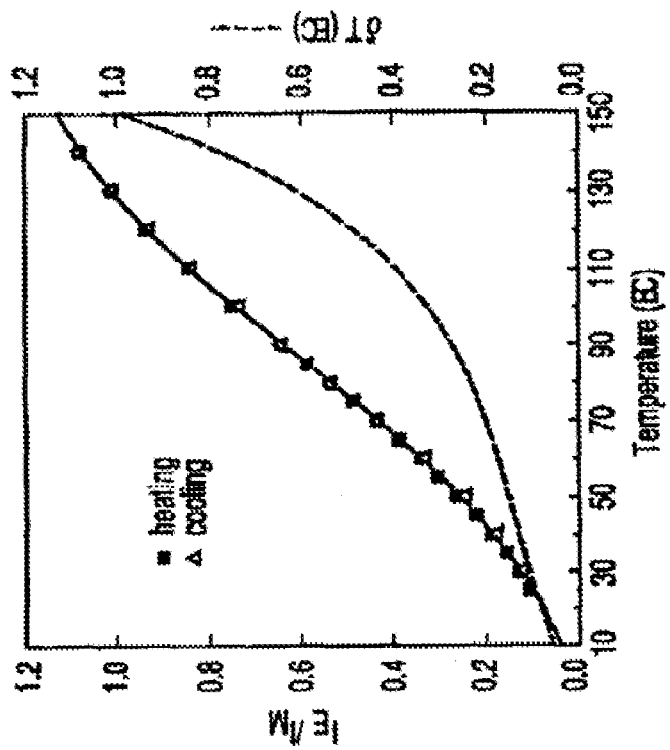
FIG. 2 illustrates an analytical working curve for an optical thermometer according to the present invention.

The response of the optical sensor according to the present invention to temperature is reversible. As shown in FIG. 2 of the drawings, the response is two-color and ratiometric. That is, the luminescent signal at one color is normalized to the intensity at a different color. The ratiometric sensor of the present invention is self-referencing and therefore highly useful. That is, the values for the ratio operate independent of total signal, optical path or amount of probe molecule and therefore are less subject to error. The ratio is independent of the intensity of the illumination source applied, the optical configuration, or the luminophore concentration.

For example, intentional photobleaching of the solution of the present invention by subjecting it to continuous UV irradiation (24 hours, 10 milliwatts (mW)) at 60 degrees Celsius resulted in a decreased intensity at the isoemissive point of the solution by 15 percent while the ratio IE/IM changed by less than 0.9 percent. This corresponds to an error in temperature estimation of the present invention of better than 0.35 degrees Celsius.

The reversibility and robustness of the temperature sensor of the present invention are demonstrated by the fact that repeated exposure to heating and cooling cycles from 60 degrees Celsius to 90 degrees Celsius over a period of 8 hours resulted in mean deviations from the working curve shown in FIG. 2 of only 0.16 degrees Celsius (at a temperature of 60 degrees Celsius) and a 0.30 degrees (at a temperature of 90 degrees Celsius).

In contrast to prior art excimer/exciplex based molecular thermometers, the upper operational range of the sensor of the present invention is not limited by the boiling point of common organic solvents but instead, depends upon the thermal stability of the fluorophore employed. As a result, the operable range for a sensor according to the present invention may extend beyond the range of 25 degrees Celsius to 140 degrees Celsius.

The present invention therefore provides a robust, precise, broad range, ratiometric, luminescent temperature sensor that provides a temperature-dependent, excited state equilibrium of a dual fluorescent reporter within an ionic liquid solvent. The sensor exhibits the thermofluid properties of the ionic liquid employed, namely its high thermal coefficient of viscosity and broad liquids range. Modification of the absolute viscosity of the solution by changing the ionic liquid may therefore be used to configure the sensor to a specific application. Since the associated wavelengths are well resolved, dispersive optics are no longer necessary, facilitating adaptation of the present invention to both inexpensive and mobile formats. Implementing confocal or multi-photon technology to subject the sensor to light can provide highly localized excitation thereby adapting the sensor to unique utilities such as on-chip PCR or laser based T-jump calibration. If the ionic liquid of the present invention is encased within thin transparent sol-gel films, nanoscale liquid-in-glass sensors may be provided in the form of temperature sensitive paints.

The sensor of the invention is adapted for use for a wide variety of industrial processes. For example, the ionic liquid and fluorophore of the present invention may be disposed in between an inner pipe and a transparent outer pipe forming a concentric sensor. The temperature along all points on the pipe may then be monitored by shining UV light on the pipe to obtain a complete temperature-based spatial map. Similarly, wings or turbines may be coated with a film of transparent sol-gel that has been embedded with the fluorescent composition of fluorophore dissolved within the ionic liquid. The film will then provide a spatial map of temperature for identifying potential points of fatigue. The ability to spatially amp temperature can also be used in conjunction with multiwell plates to monitor temperature in multiple wells. This would be done by using a thin film of fluophor in ionic liquid on the bottom of the multi-well plate and sealing with a transparent cover.

While this invention is described as having a preferred design, it is understood that it is capable of further modification, uses and/or adaptations following in general the principle of the invention and including such departures from the present disclosures as come within known or customary practice in the art to which the invention pertains, and as may be applied to the essential features as set forth and fall within the scope of the invention or the limits of the appended claims.

What is claimed is:

1. A method for measuring the surface temperature of an object, said method comprising:

a) providing at least one fluorescent compound capable of forming an excimer and 1-butyl-1-1-methyl pyrrolidinium bis(trifluoromethylsulfonyl imide ionic liquid solvent, said at least one fluorescent compound capable of forming an excimer being dissolved within said imide ionic liquid solvent to provide a fluorescent solution adapted to convey a temperature dependent luminescent signal upon UV irradiation;
b) containing said fluorescent solution in a container with at least one light transparent surface;
c) placing said container in contact with the object to be temperature measured;
d) irradiating said placed container with a UV light sufficient to generate at least two excited states that exist in equilibrium upon formation of an excimer within the fluorescent solution; and
e) detecting the light signal generated by said fluorescent solution following irradiation by said ultraviolet light source.

2. The method of claim 1, wherein said container is selected from the group consisting of concentric pipe with at least a transparent outer wall and a transparent sol-gel material.

3. The method of claim 1, wherein said container also contains at least one well.

4. The method of claim 1, wherein said at least one fluorescent compound capable of forming an excimer contains a pyrenyl group.

5. The method of claim 4, wherein said at least one fluorescent compound capable of forming an excimer is 1,3-bis(1-pyrenyl)propane.

6. The method of claim 1, comprising the further step of:
f) measuring the position of the equilibrium between the two excited states to provide the temperature of said object.

7. The method of claim 1, wherein the step of irradiating said container further comprises:
utilizing confocal or multi-photon technology so that said fluorescent solution is subjected to highly localized excitation.

8. The method of claim 2, further comprising the steps of:
selecting the sol-gel material as said container, and
disposing said material as a thin film to be used as a coating.

9. The method of claim 8, wherein a further step comprises:
sealing said thin film with a transparent cover when it is used as a coating.

10. The method of claim 2, further comprising the steps of:
selecting the sol-gel material as said container, and
disposing said material as a thin film, and
encapsulating said thin film as small liquid-in-glass sensors, said sensors being provided as an additive in the formulation of temperature sensitive paints.

* * * * *